United States Patent
Schwarze et al.

(10) Patent No.: US 7,370,007 B2
(45) Date of Patent: May 6, 2008

(54) CATALOG SEARCH AGENT

(75) Inventors: Peter Schwarze, St. Leon-ROT (DE); Karin Brecht-Tillinger, Edingew-Neckarhausen (DE); Jens Kisker, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 882 days.

(21) Appl. No.: 10/669,893

(22) Filed: Sep. 23, 2003

(65) Prior Publication Data
US 2006/0173751 A1    Aug. 3, 2006

Related U.S. Application Data

(60) Provisional application No. 60/427,509, filed on Nov. 18, 2002.

(51) Int. Cl.
G06F 17/30 (2006.01)
G06Q 30/00 (2006.01)

(52) U.S. Cl. .................... 705/27; 705/26

(58) Field of Classification Search .......... 705/27, 705/26
See application file for complete search history.

(56) References Cited

U.S. PATENT DOCUMENTS

| | | |
|---|---|---|
| 6,324,534 B1 * | 11/2001 | Neal et al. ............ 707/3 |
| 7,047,211 B1 * | 5/2006 | Van Etten et al. ......... 705/26 |
| 2001/0044751 A1 * | 11/2001 | Pugliese et al. ......... 705/26 |
| 2002/0138370 A1 * | 9/2002 | Dan et al. ............ 705/27 |
| 2003/0177070 A1 * | 9/2003 | Viswanath et al. ....... 705/26 |
| 2004/0148232 A1 * | 7/2004 | Fushimi et al. ......... 705/27 |
| 2005/0234888 A1 * | 10/2005 | Bailey et al. ........... 707/3 |

FOREIGN PATENT DOCUMENTS

EP    0697669 A2 *   2/1996
KR    20020066719 A *   8/2002

OTHER PUBLICATIONS

Etzioni, O., "The World Wide Web: Quagmire or Gold Mine?" Communications of the ACM, vol. 39, No. 11, pp. 65-68, Nov. 1996.*
Mendelson, E., "Innovative Software GMBh: Jave Booster," PC Magazine, vol. 17, No. 6, p. 199, Mar. 24, 1998.*
Anon., "Lexmark Joins E-Commerce Pilot to Give Customers Easier and Better Way to Compare Products on the Web," Business Wire, Jul. 27, 1998.*
Dorobek, C., "Group Demos Way to Shop Multiple E-Catalogs," Government News, vol. 17, No. 40, p. 8, Dec. 14, 1998.*
Anon., "Intelisys Partners with Mercado Software of Offer Intuitive Search Across Multi-Supplier Catalogs without the Need for Normalization," Business Wire, p. 0413, May 15, 2000.*

(Continued)

Primary Examiner—Nicholas D. Rosen
(74) Attorney, Agent, or Firm—Fish & Richardson P.C.

(57) ABSTRACT

A computer-based system that provides services for searching and displaying catalog items. The system enables a user to pass a request to one or more catalog servers and display aggregated results in a user interface. Furthermore, the system enables the user to select one or more items from the user interface and transfer the one or more items to a procurement system for additional processing.

29 Claims, 9 Drawing Sheets

OTHER PUBLICATIONS

Anon., "EasyAsk Breaks the Search Barrier; Early Adopter Is Building a Distributed E-Commerce Supplier Network," Business Wire, Jul. 31, 2000.*

Anon., "Easy Spirit Adopts e7th's Secure Online Wholesale Trasnaction Technology; Nine West's Largest Brand Becomes 34th Retailer in e7th's Multi-vendor Catalog," Business Wire, Sep. 26, 2000.*

Anon., "SPS Commerce Launches B-to-B Catalog Synchronization Capabilities to Increase Supply Chain Efficiencies," PR Newswire, Apr. 30, 2001.*

Anon., "Convera and PartNET Selected by Department of Defense EMALL; Improved Site Eases Use by Providing Seven Advanced Search Options," Business Wire, Jun. 25, 2002.*

Anon., "HP Products Now Available at US Navy's ITEC Mall," PR Newswire, Aug. 12, 1998.*

"*XML-Based Frameworks For Internet Commerce*" [online]. ICEIS 2000, [retrieved on Nov. 20, 2007]. Retrieved from the Internet: <URL: http://www.ida.liu.se/?yuxzh/doc/iceis-000429.pdf>.

Jay M. Tenenbaum et al., "*Eco System: An Internet Commerce Architecture*", IEEE (1997) pp. 48-55.

* cited by examiner

FIG. 1

Sample OCI Outbound Interface Fields

| Description | Mandatory | Catalog-Specific | Field Name | Field Name Variable/Fixed |
|---|---|---|---|---|
| Catalog URL | Yes | Yes | <Blank> | Fixed |
| All Catalog Specific Fields | As Relevant | Yes | | Variable |
| Return URL | Yes | No | HOOK_URL | Variable |
| OK Code | Yes | No | ~OKCODE | Fixed |
| Target | Yes | No | ~TARGET | Fixed |
| Caller | Yes | No | ~CALLER | Fixed |

FIG. 2

Sample OCI Inbound Interface Fields

| Item | Name | Required/Optional | Type Length |
|---|---|---|---|
| Description | NEW_ITEM-DESCRIPTION[n] | Required if Product Master is not Specified | CHAR-40 |
| Product Master | NEW_ITEM-MATNR[n] | Required if the Description Field is not Specified | CHAR-18 |
| Product Group | NEW_ITEM-MATGROUP[n] | Optional | CHAR-10 |
| Quantity | NEW_ITEM-QUANTITY[n] | Required | CHAR-15 |
| Unit of Measure | NEW_ITEM-UNIT[n] | Required if Product Master Field is not Filled | CHAR-3 |
| Price | NEW_ITEM-PRICE[n] | Optional | CHAR-15 |
| Price Unit | NEW_ITEM-PRICEUNIT[n] | Optional | CHAR-9 |
| Currency | NEW_ITEM-CURRENCY[n] | Required if Price is Returned, Otherwise Optional | CHAR-5 |
| Lead Time | NEW_ITEM-LEADTIME[n] | Optional | CHAR-5 |
| Vendor | NEW_ITEM-VENDOR | Optional | CHAR-10 |
| Product ID | NEW_ITEM-EXT_PRODUCT_ID[n] | Optional | CHAR-40 |
| Catalog ID | NEW_ITEM-EXT_CATEGORY | Optional | CHAR-40 |

FIG. 3A

```
<HTML>
<HEAD>
<HEAD>
<H1>SAP Open Catalog Interface: HTML - Example</H1>
</HEAD>
<P>This is an example, what needs to be generated by the catalog engine, if the user is done with picking items in his shopping basket.</P>
<P>View the source of this file to see all the text inputs.</P>
<BODY bgcolor="#DED6C2">
<FORM action="<%=Request.QueryString("HOOK_URL")%>" method=post target=_top>
<!--For more information about the interface fields, refer to the catalog interface description-->
<!--Item number 1-->
<input type="hidden" name="NEW_ITEM-DESCRIPTION[1]" value="Pen, Easytouch, Medium, Black">
<input type="hidden" name="NEW_ITEM-MATNR[1]" value="">
<input type="hidden" name="NEW_ITEM-MATGROUP[1]" value="">
<input type="hidden" name="NEW_ITEM-QUANTITY[1]" value="1">
<input type="hidden" name="NEW_ITEM-UNIT[1]" value="EA">
<input type="hidden" name="NEW_ITEM-PRICE[1]" value="0.50">
<input type="hidden" name="NEW_ITEM-PRICEUNIT[1]" value="5">
<input type="hidden" name="NEW_ITEM-CURRENCY[1]" value="USD">
<input type="hidden" name="NEW_ITEM-LEADTIME[1]" value="1">
<input type="hidden" name="NEW_ITEM-VENDOR[1]" value="1768">
<input type="hidden" name="NEW_ITEM-VENDORMAT[1]" value="648570">
<input type="hidden" name="NEW_ITEM-MANUFACTCODE[1]" value="4711">
```

FIG. 3B-1

```
<input type="hidden" name="NEW_ITEM-MANUFACTMAT[1]" value ="4712">
<input type="hidden" name="NEW_ITEM-CONTRACT[1]" value ="111">
<input type="hidden" name="NEW_ITEM-CONTRACT_ITEM[1]" value ="1111">
<input type="hidden" name="NEW_ITEM-SERVICE[1]" value ="">
<input type="hidden" name="NEW_ITEM-EXT_QUOTE_ID[1]" value ="111">
<input type="hidden" name="NEW_ITEM-EXT_QUOTE_ITEM[1]" value ="1111">
<input type="hidden" name="NEW_ITEM-EXT_PRODUCT_ID[1]" value ="11111">
<input type="hidden" name="NEW_ITEM-LONGTEXT_1:132[]" value ="longtext_1:
The best pen in our program, lightweight and easy to handle">
<input type="hidden" name="NEW_ITEM-CUST_FIELD1[1]" value="custf 1.1">
<input type="submit" value=" Transfer Items to B2B shopping basket"
id=submit1 name=submit1 > <br>
</FORM>
© 2000, SAP AG
</BODY>
</HTML>
```

RESULT SCREEN

| Description | Source | Price | Quantity |
|---|---|---|---|
| ○ IBM LAPTOP RS455 | IBM COMPUTER CATALOG | 840.00 | ☐ Stock |
| ○ DELL COMPANION PRO 3422 | DELL LAPTOP CATALOG | 698.00 | ☐ Stock |
| ○ DELL COMPANION PROPLUS | DELL LAPTOP CATALOG | 745.00 | ☐ Stock |
| ○ INTEL XRL70X 38483 | INTEL HARDWARE CATALOG | 729.00 | ☐ Stock |

[Send]

CATALOG SEARCH AGENT

CROSS-REFERENCE TO RELATED APPLICATIONS

This application claims priority to U.S. Provisional Application Ser. No. 60/427,509, filed on Nov. 18, 2002, and entitled, "Web Service Integration".

BACKGROUND

This invention relates to catalog searching by software application agents.

Businesses and individuals often rely on catalogs to determine what products or services may be obtained from a particular supplier, and to receive information (such as price, available colors and styles, etc.) about those products and services. Electronic catalogs provide a number of advantages for companies that wish to provide information about their products and services to potential customers. For example, electronic catalogs can be updated and distributed more easily than can paper catalogs. Electronic catalogs can also provide automated searching capabilities so that customers can more readily find the information they seek.

Each supplier generally produces its own catalog, and each of these catalogs may be formatted in a different manner than other catalogs. Also, a catalog may contain information not contained in other catalogs for similar products or services. Therefore, it can be difficult for a potential customer who is trying to find a product but is not focused on a single supplier, to receive concise, usable information about the product, especially where the information comes from a number of vendors.

SUMMARY

A computer-based system that provides services for searching and displaying catalog items. The system enables a user to pass a request to one or more catalog servers and display aggregated results in a user interface. Furthermore, the system enables the user to select one or more items from the user interface and transfer the one or more items to a procurement system for additional processing.

A user may use a client computer to compose and send a request for one or more catalog items, e.g., in a text string, to a catalog search agent in the system, e.g., over a Web portal. The catalog search agent may then format the request according to a catalog interface protocol, e.g., the Open Catalog Interface (OCI), and send the formatted request to a plurality of catalog servers. Formatting the request may include generating multiple formatted requests, each formatted request including a URL for one of the catalog servers and one or more query terms in one or more fields according to the catalog interface protocol.

The catalog search agent may take the responses received from the catalog servers, and parse the responses according the protocol to obtain the results. The catalog search agent may then send the results from the plurality of catalog servers to the user. The results may be formatted to be displayed in a single display screen.

DETAILED DESCRIPTION

Figure 1:
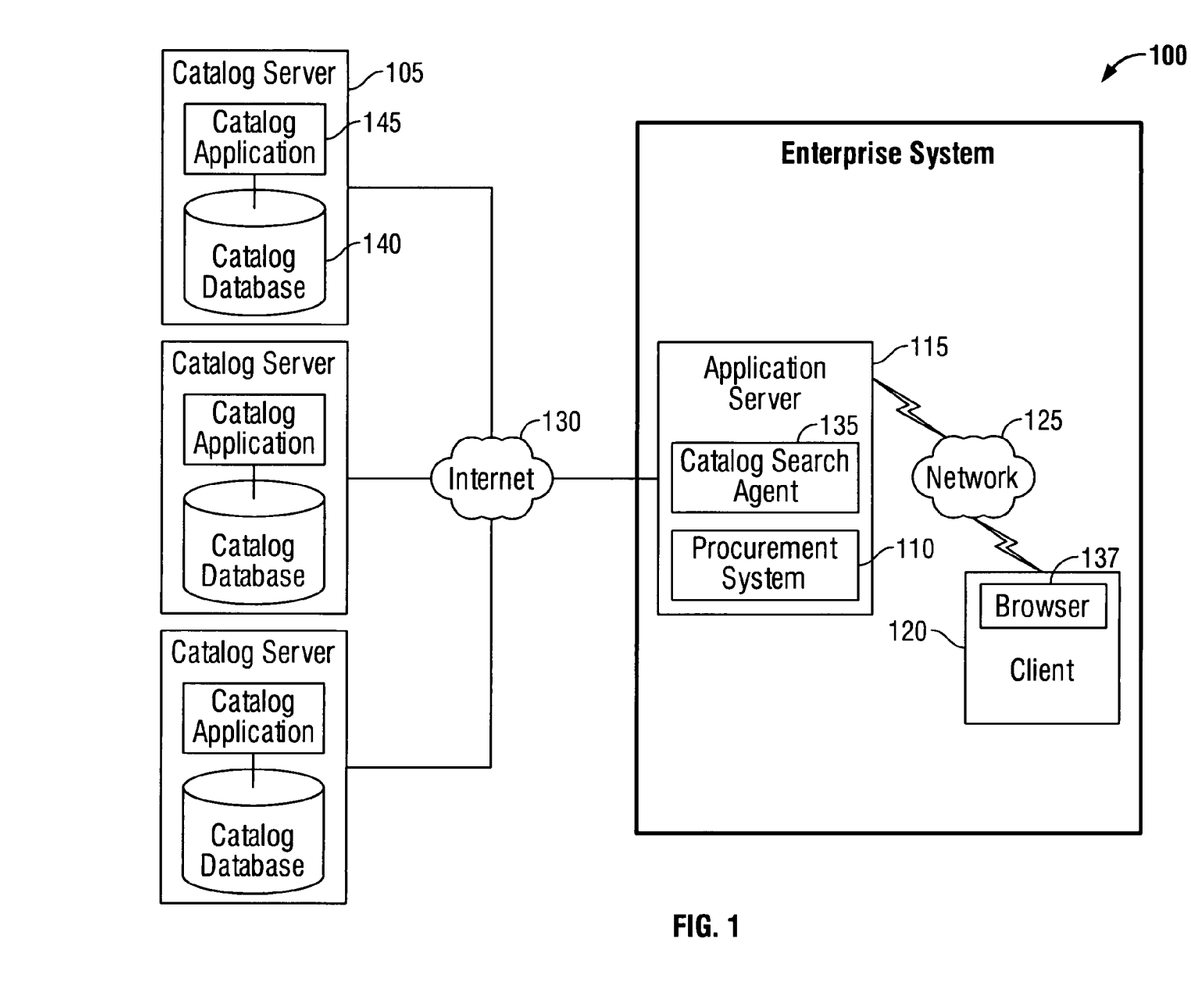
FIG. 1 is a block diagram of a computer-based system that provides services for searching and displaying items from multiple catalogs.

FIG. 1 shows a computer-based system 100 that provides services for searching and displaying items from multiple catalogs. The system enables a user to pass a request (e.g., as a search string) to one or more catalog servers 105 and display aggregated results in a user interface (UI). The system 100 may also enable to the user to select one or more items from the UI and transfer the items to an electronic procurement system 110 for additional processing, such as generating a purchase order for selected item(s).

The system includes an application server 115 that may be connected to a client 120 through a network 125, e.g., a LAN (Local Area Network), WAN (Wide Area Network), or Web portal. Users may interact with the application server 119 through the client 120, e.g., a personal computer (PC) or a terminal connected directly to the application server. The application server 115 may communicate with the catalog servers 105 via an external network, e.g., the Internet 130.

The application server 115 may include a search agent 135 and the electronic procurement system 110. In an alternative embodiment, multiple application servers may be configured and the search agent 135 and the electronic procurement system 110 may reside on different servers.

The electronic procurement system 110 may provide purchase order processing and administrative functions for buyers and suppliers. For example, the electronic procurement system 110 may use Internet technology to streamline, manage and report on corporate purchasing functions.

The electronic procurement system 110 may implement software applications tailored to a corporation's specific purchasing agreements, internal procedures and business rules. In an embodiment, the electronic procurement system 110 may enable self-service purchasing for employees of the enterprise implementing the application server, allowing the employees to select and purchase products from the client through using a Web browser 137 at the client.

The catalog servers 105 may be provided by multiple external vendors. A catalog server may include a catalog database 140 that stores information regarding available products and services, and a catalog application 145 that searches the catalog database based on a request and compiles and returns results based on the request. The catalog application 145 may utilize one or more catalog search methodologies (e.g. fuzzy logic and other artificial intelligence techniques) to retrieve information from the catalog database 140. The format of the catalog database 140 may be varied. For example, the catalog database 140 may reside in a relational database or an object-orientated database.

The electronic procurement system 110 and the catalog applications 145 may communicate using a catalog interface protocol. In an embodiment, the Open Catalog Interface (OCI) developed by SAP A G of Walldorf, Germany is used.

The OCI uses standard Internet protocols, e.g., HTTP (Hypertext Transfer Protocol), to exchange information between the application server and the catalogs. Using the OCI, the electronic procurement system 110 may send a request in an OCI-compliant format to a catalog application, and the catalog application may return a response page, including results compiled in response to the request, in an OCI-compliant format.

Figure 2:
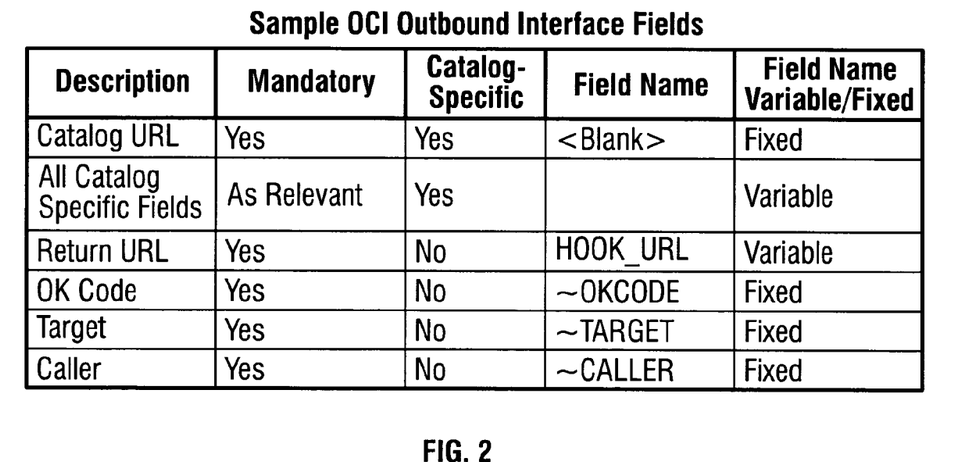
FIG. 2 shows exemplary fields for an OCI (Open Catalog Interface) outbound interface.

The OCI includes an outbound section and an inbound section. The outbound section consists of information that is sent to the catalog application by the electronic procurement system. This information originates in the electronic procurement system, where it is created and maintained. The information may be stored in fields in a table. Every field contains a name-value pair and has a type. The information stored in the table for each catalog server may include the following information: the catalog URL, which should refer to the location of the catalog application; catalog specific fields, such as username and password; and a return URL used by the catalog server to return to the electronic procurement system from the catalog application. FIG. 2 shows exemplary fields for an OCI outbound interface.

Using this information, the electronic procurement system 110 constructs a URL call to the catalog application and may redirect the client browser 137 to this URL. In an embodiment, the catalog may be accessed using the HTTP methods GET or POST, which includes the outbound interface field data. The catalog application then parses and decodes this data and may perform a search based on the data.

Figure 3A:
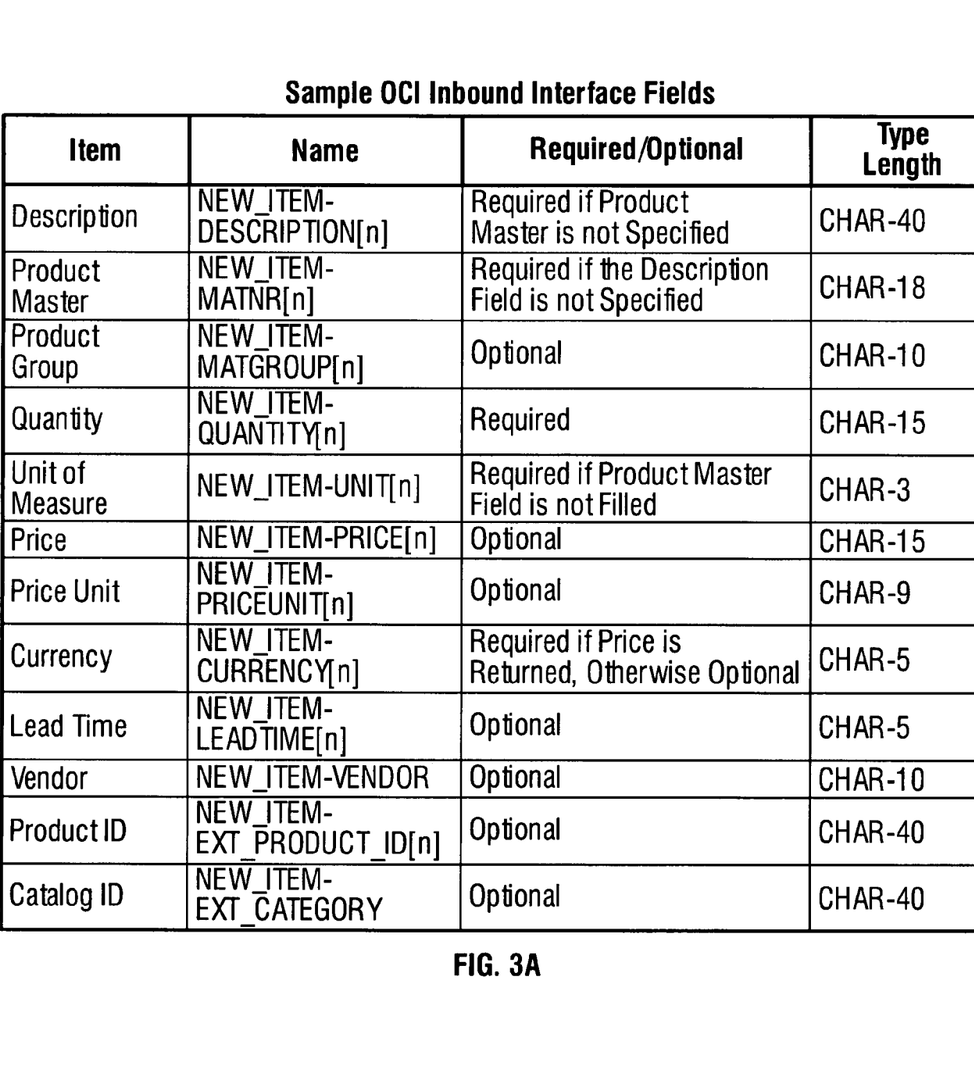
FIG. 3A shows exemplary fields for an OCI inbound interface.
Figure 3B:
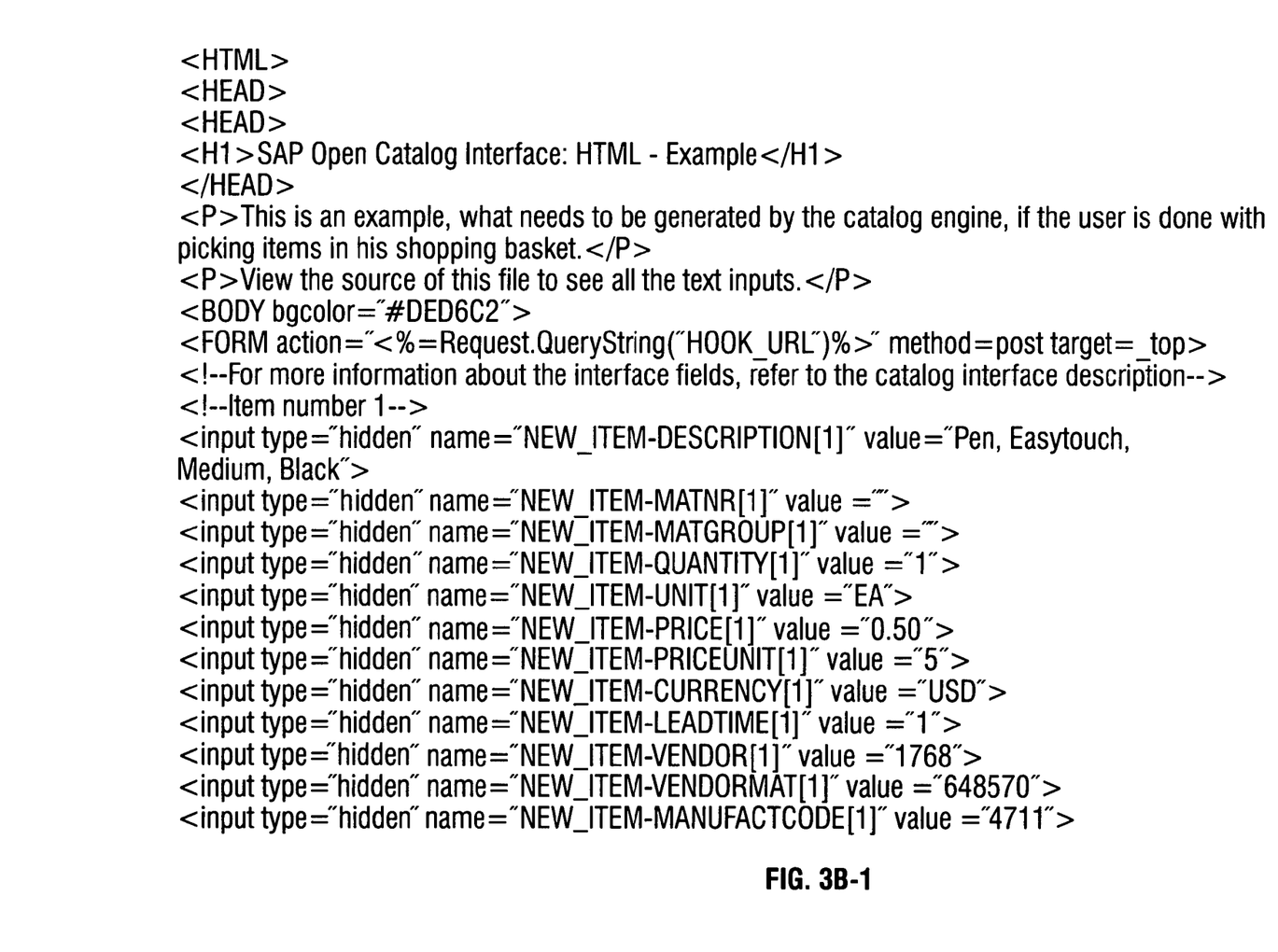
FIG. 3B shows an exemplary OCI-compliant HTML response page.
Figure 3B:
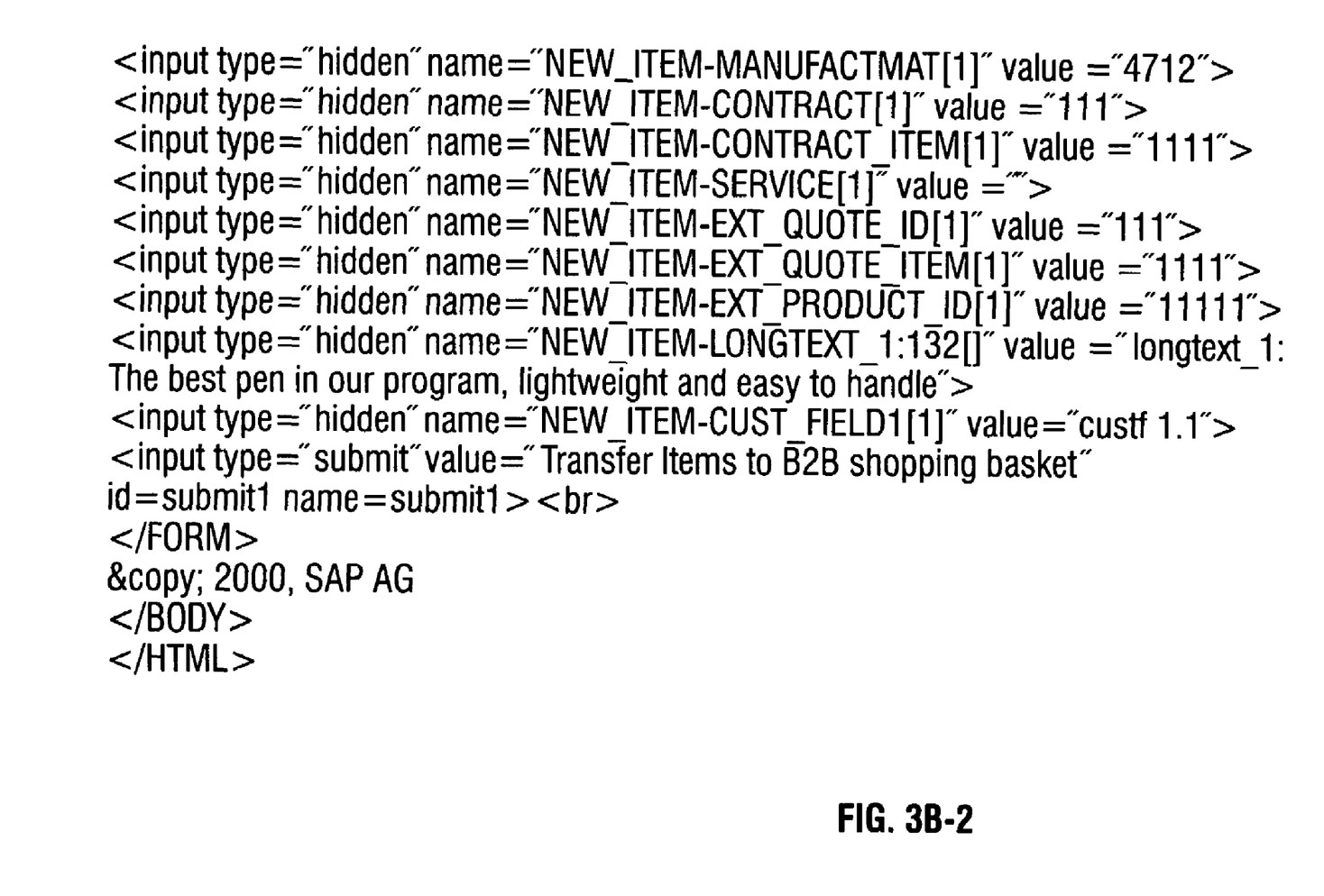

The inbound section consists of information that is sent to the electronic procurement system 110 by the catalog application 145. The inbound section may be sent back to the electronic procurement system in an OCI-compliant, e.g., an HTML page or an XML file. For each item selected in the catalog and sent to the electronic procurement system, all required fields must be sent, along with the optional fields. The fields may include the following information: a description of the item; a quantity to add; a unit of measure of the item; a price; a currency; a product master number in the electronic procurement system; and a number of days until the item will be available. FIG. 3A shows exemplary fields for an OCI inbound interface, and FIG. 3B shows an exemplary HTML response page.

Figure 4:
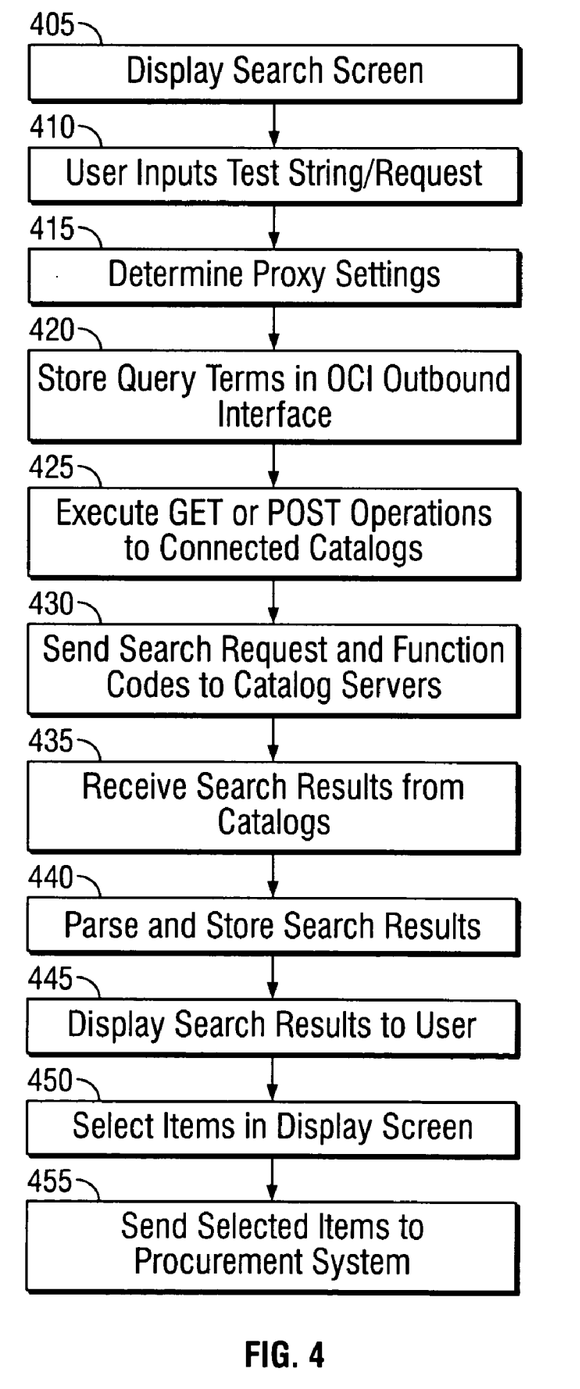
FIG. 4 is a flowchart describing a multi-catalog search.

The system 100 may enable a user at the client 120 to search several catalogs by entering a single search string. FIG. 4 is a flowchart describing a multi-catalog search operation according to an embodiment.

Figure 5:
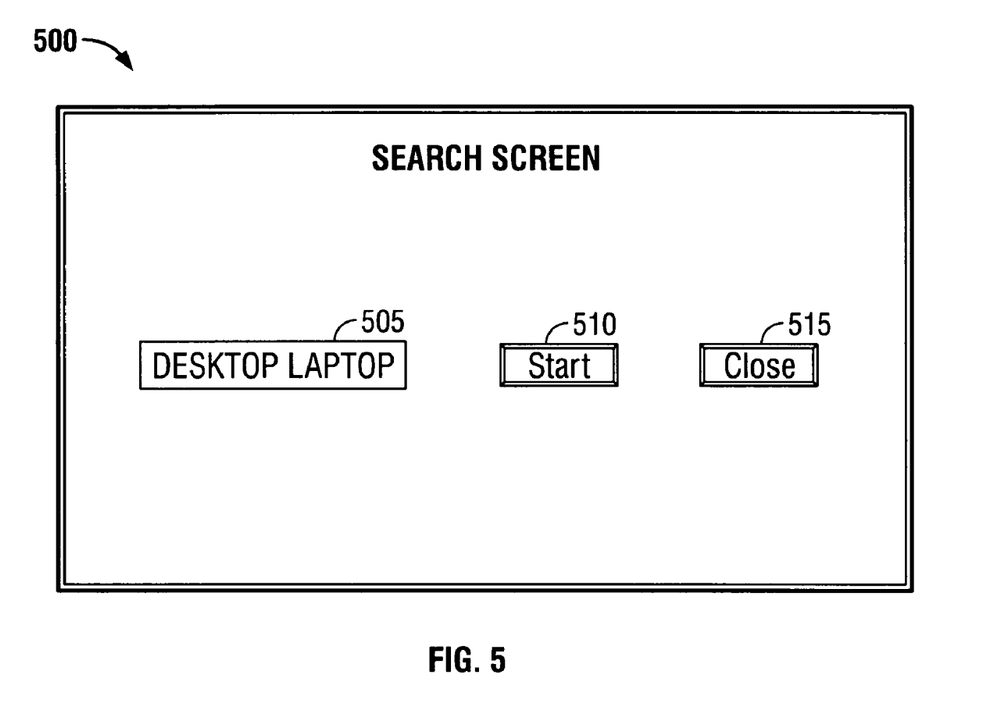
FIG. 5 shows a search screen display.

The search agent 135 may display a search screen 500 such as that shown in FIG. 5, in response to a request from the electronic procurement system 110 or in response to a file menu command executed at the client 120 (block 405). In an embodiment, the search screen 500 provides a UI that includes a text input field 505 that may be used for entering search criteria, a start button 510 that initiates a search process, and a close button 515 that terminates the search screen 500.

The user enters the request in the text input field (block 410). The text input field 505 accepts a search string, e.g., a free-form string, which may be any combination of alpha-numeric characters or search terms requiring no particular syntax. For example, the search string may include the name of an item, a part number for an item, or any descriptive attribute of the item. In an embodiment, once one or more search terms have been entered in the text input field 505 and the user selects the start button 540, the search agent 135 may send search requests based on the input text string to one or more of the catalog servers for execution. The search agent may populate fields in an OCI outbound interface with terms entered in text input field and transmit the information using the HTTP GET or POST method.

In an embodiment, the search agent 135 may execute a search algorithm for sending search requests and receiving search results. Upon selection of the start button 505 on search screen 500, the search agent may determine the proxy settings of the web browser 137 at the client displaying the search screen. The search agent may determine catalogs servers accessible to a particular user for electronic purchases from the user's web browser proxy settings. The search agent may then access information accepted by the text input field on the search screen and store this information in a communications protocol that may be interpreted by catalog servers, e.g. the OCI protocol (block 420). The search agent may execute HTTP GET or POST operations to one or more connected catalog servers (block 425) and pass search requests to the catalog servers (block 430). In an embodiment, search agent 16 may pass the OCI outbound interface for the catalog application 145 processing instead of redirecting the client browser 137.

Figure 6:
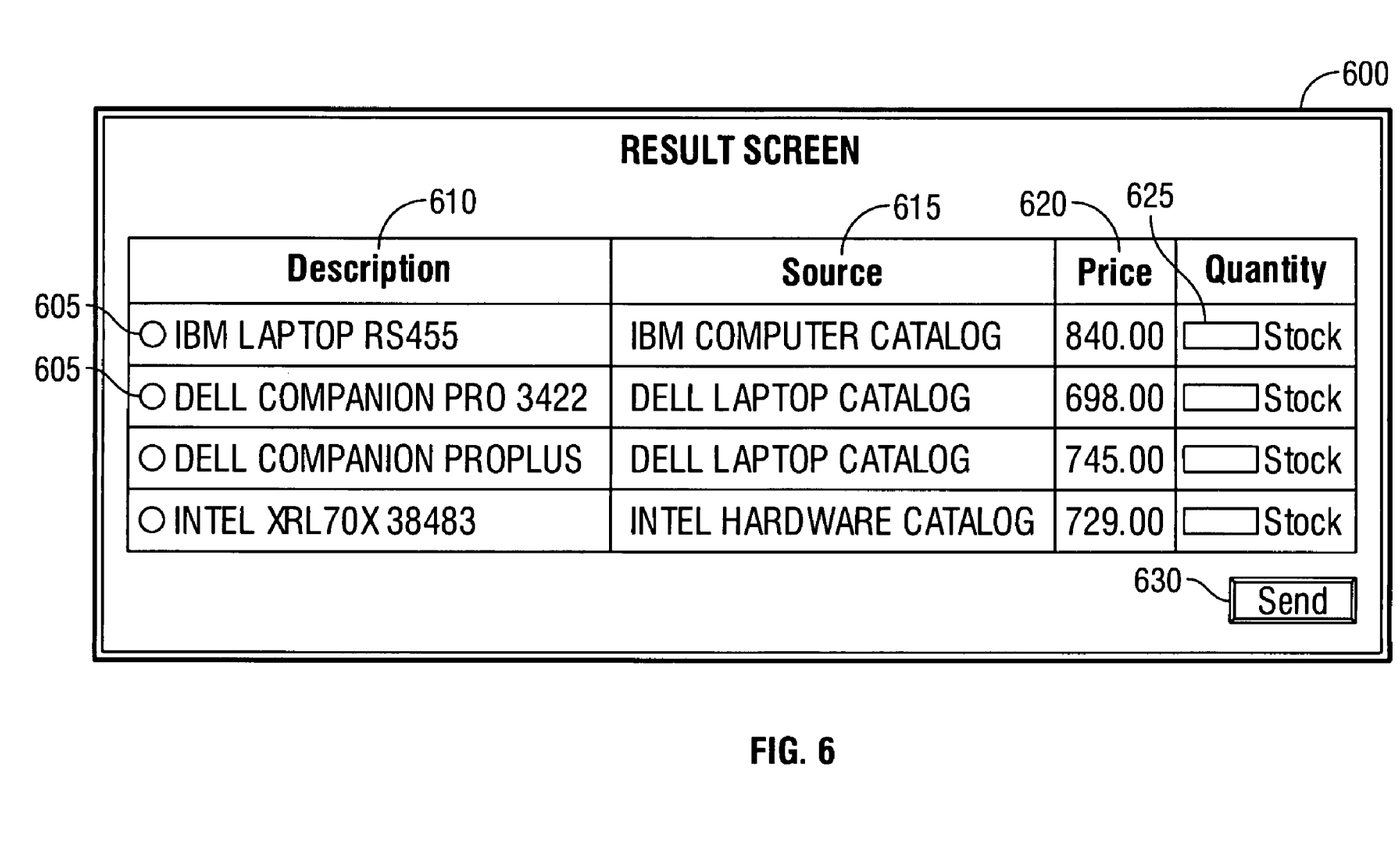
FIG. 6 shows a search result screen display.

The search agent 135 may receive search results from the one or more catalog servers according to the communication protocol (block 435), e.g., an OCI outbound interface including an HTML or XML response page with the appropriate required (and optional) fields. The search agent may then parse the response page to obtain the search results and store the search results in a generic consistent format in a shared area of memory (block 440). Once all the catalog servers have responded with search results, the search agent may display the aggregated search results in a single search result screen 600, as shown in FIG. 6.

Figure 7:
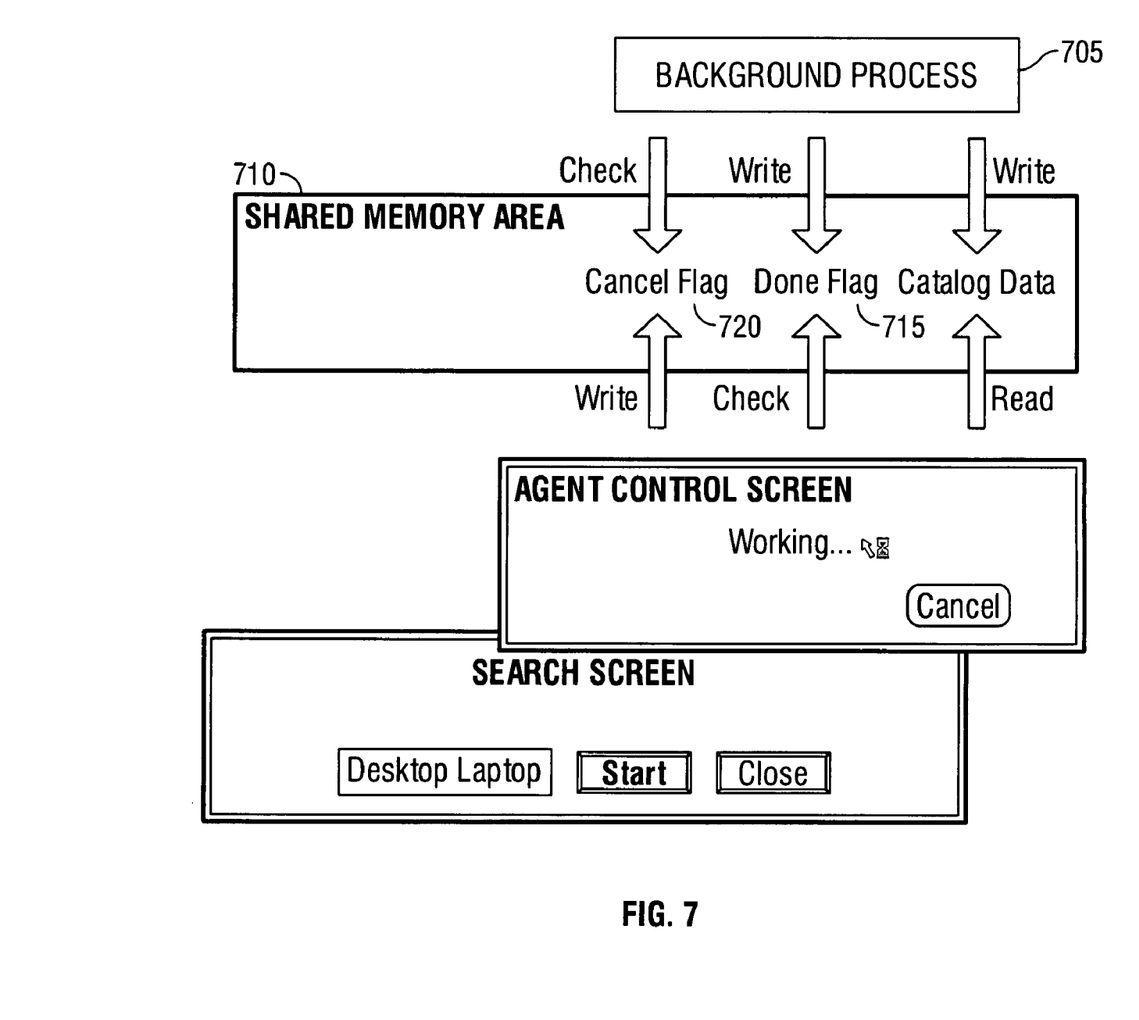
FIG. 7 illustrates a background process at the application server that receives the single responses from each of the catalogs.

The search agent 135 may receive the result pages asynchronously from the catalog servers in a background process. As shown in FIG. 7, the background process 705 receives the single responses from each of the catalogs and stores them in a shared memory 710. When all the catalogs have returned their data, a flag 715 that indicates that the search is done is set in the memory. This flag may be read periodically by the generic results screen.

In an embodiment, the results screen may enable the user to terminate the search by, e.g., pressing a button that writes a "cancel flag" 720 to the shared memory. This flag may be periodically evaluated after each response from a catalog.

The result screen 600 provides an aggregated, unified display of retrieved catalog data items from one or more catalog servers for display at the client. In an embodiment, the result screen may have a user-selectable option fields 605 (e.g., check boxes) to select one or more items retrieved from catalog servers for additional processing. In addition, in some embodiments, the result screen may provide sortable display columns indicating the product or service description 610 for retrieved catalog items, the source 615 of catalog data, price information 620 for retrieved catalog items, and one or more data entry fields 625 associated with catalog items that the user may use to indicate the quantity of each item for electronic purchase. The search agent may indicate ratings based on, e.g., price or some other attribute, and may apply customized business rules for the enterprise, e.g., retaining only the lowest priced items.

Upon selection of items via user selectable option fields 605 and selecting send button 630 (block 450), the search agent may format the selected items in a OCI outbound interface (e.g., a requisition page) and transmit the page to the procurement system 110 for requisition processing.

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

The invention claimed is:

1. A method comprising:
   receiving a request for at least one catalog item from a requestor;
   formatting the request according to a catalog interface protocol;
   determining a plurality of catalog servers available to the request, said determining comprising determination by an application server of available catalog servers from proxy settings of a browser used by the requestor;
   sending the formatted request to a plurality of catalog servers;
   receiving a response from each of the plurality of catalog servers in a format conforming to the catalog interface protocol, each of the responses including results describing at least one catalog item identified in response to the request;
   parsing the responses to obtain the results; and
   sending the results from the plurality of catalog servers to the requestor.

2. The method of claim 1, further comprising displaying the results in a single display screen.

3. The method of claim 1, wherein the catalog interface protocol comprises the Open Catalog Interface (OCI) protocol.

4. The method of claim 1, wherein said receiving the request comprises receiving a text string.

5. The method of claim 1, wherein the request includes at least one query item, and
   wherein formatting the request comprises generating a plurality of formatted requests, each formatted request including a URL for one of the plurality of catalog servers and the at least one query item in at least one field according to the catalog interface protocol.

6. The method of claim 1, wherein the request includes data identifying attributes of catalog items in a plurality of fields.

7. The method of claim 1, wherein sending the formatted request comprises connecting to a catalog server including a catalog database.

8. The method of claim 1, wherein said receiving the plurality of responses comprises receiving a plurality of HTML pages.

9. The method of claim 1, wherein said receiving the plurality of responses comprises receiving a plurality of XML pages.

10. The method of claim 1, further comprising, at one of the catalog servers:
    parsing the formatted request according to the catalog interface protocol;
    generating the response describing at least one catalog item identified in response to the request; and
    returning the response.

11. An article including a machine-readable medium including machine-executable instructions operative to cause a machine to perform the steps of:
    receiving a request for at least one catalog item from a requestor;
    formatting the request according to a catalog interface protocol;
    determining a plurality of catalog servers available to the request, said determining comprising determination by an application server of available catalog servers from proxy settings of a browser used by the requestor;
    sending the formatted request to a plurality of catalog servers;
    receiving a response from each of the plurality of catalog servers in a format conforming to the catalog interface protocol, each of the responses including results describing at least one catalog item identified in response to the request;
    parsing the responses to obtain the results; and
    sending the results from the plurality of catalog servers to the requestor.

12. The article of claim 11, further comprising instructions operative to cause the machine to display the results in a single display screen.

13. The article of claim 11, wherein the catalog interface protocol comprises the Open Catalog Interface (OCI) protocol.

14. The article of claim 11, wherein said receiving the request comprises receiving a text string.

15. The article of claim 11, wherein the request includes at least one query item, and
    wherein formatting the request comprises generating a plurality of formatted requests, each formatted request including a URL for one of the plurality of catalog servers and the at least one query item in at least one field according to the catalog interface protocol.

16. The article of claim 11, wherein the request includes data identifying attributes of catalog items in a plurality of fields.

17. The article of claim 11, wherein sending the formatted request comprises connecting to a catalog server including a catalog database.

18. The article of claim 11, wherein said receiving the plurality of responses comprises receiving a plurality of HTML pages.

19. The article of claim 11, wherein said receiving the plurality of responses comprises receiving a plurality of XML pages.

20. A system comprising:
    a client operative to enable a user to compose and send a request for at least one catalog item; and
    a catalog search agent operative to:
      receive the request from the requestor,
      format the request according to a catalog interface protocol,
      determine a plurality of catalog servers available to the request, said determining comprising determination by an application server of available catalog servers from proxy settings of a browser used by the requestor,
      receive a response from each of the plurality of catalog servers in a format conforming to the catalog interface protocol, each of the responses including results describing at least one catalog item identified in response to the request,
      parse the responses to obtain the results, and
      send the results from the plurality of catalog servers to the requestor.

21. The system of claim 20, wherein the client includes a browser operative to communicate with the catalog search agent over a Web portal.

22. The system of claim 20, wherein the catalog search agent is further operative to display the results in a single display screen.

23. The system of claim 20, wherein the catalog interface protocol comprises the Open Catalog Interface (OCI) protocol.

24. The system of claim 20, wherein said receiving the request comprises receiving a text string.

25. The system of claim 20, wherein the request includes at least one query item, and
    wherein formatting the request comprises generating a plurality of formatted requests, each formatted request including a URL for one of the plurality of catalog servers and the at least one query item in at least one field according to the catalog interface protocol.

26. The system of claim 20, wherein the request includes data identifying attributes of catalog items in a plurality of fields.

27. The system of claim 20, wherein sending the formatted request comprises connecting to a catalog server including a catalog database.

28. The system of claim 20, wherein said receiving the plurality of responses comprises receiving a plurality of HTML pages.

29. The system of claim 20, wherein said receiving the plurality of responses comprises receiving a plurality of XML pages.

\* \* \* \* \*